(12) United States Patent
Camminadi et al.

(10) Patent No.: US 11,754,052 B2
(45) Date of Patent: Sep. 12, 2023

(54) SENSOR UNIT AND GEAR HAVING AT LEAST ONE SUCH UNIT

(71) Applicant: Flender GmbH, Bocholt (DE)

(72) Inventors: Julia Camminadi, Oberhausen (DE); Ricardo van Manen, Bocholt (DE)

(73) Assignee: FLENDER GMBH, Bocholt (DE)

( * ) Notice: Subject to any disclaimer, the term of this patent is extended or adjusted under 35 U.S.C. 154(b) by 319 days.

(21) Appl. No.: 17/005,289

(22) Filed: Aug. 27, 2020

(65) Prior Publication Data

US 2021/0062793 A1 Mar. 4, 2021

(30) Foreign Application Priority Data

Aug. 30, 2019 (EP) ..................................... 19194547

(51) Int. Cl.
*F03D 15/00* (2016.01)
*F03D 17/00* (2016.01)
*B33Y 80/00* (2015.01)
*F03D 80/80* (2016.01)
*G01H 11/06* (2006.01)
(Continued)

(52) U.S. Cl.
CPC .............. *F03D 17/00* (2016.05); *B33Y 80/00* (2014.12); *F03D 15/00* (2016.05); *F03D 80/82* (2016.05); *G01D 11/245* (2013.01); *G01D 11/30* (2013.01); *G01D 21/00* (2013.01); *G01H 11/06* (2013.01); *G01K 7/02* (2013.01); *G01L 5/00* (2013.01); *H02K 7/116* (2013.01); *H02K 7/1838* (2013.01)

(58) Field of Classification Search
CPC ........... G01K 7/02; G01L 15/00; F03D 80/82; F03D 15/00; F03D 17/00
See application file for complete search history.

(56) References Cited

U.S. PATENT DOCUMENTS 6,535,135 B1 * 3/2003 French ................. F16C 19/522
340/682
2003/0030565 A1 * 2/2003 Sakatani ............. G01M 13/045
340/682
(Continued)

FOREIGN PATENT DOCUMENTS

BR PI0908979 A2 8/2015
BR 102018001280 A2 6/2018
(Continued)

OTHER PUBLICATIONS

European Search Report for European Application No. 19194547.6-1010 dated Mar. 18, 2020.
(Continued)

*Primary Examiner* — Jamel E Williams
(74) *Attorney, Agent, or Firm* — Lempia Summerfield Katz LLC (57) ABSTRACT

A sensor unit includes sensor constituent parts of various sensor devices and at least one printed circuit board that has voltage supply and signal transmission components for the sensor constituent parts and to which the sensor constituent parts are connected. The sensor unit has an annular base body that receives the sensor constituent parts and the at least one printed circuit board. A gear having such a sensor unit is also provided. A drive train having such a gear, a wind power installation having such a drive train, and an industrial application having such a gear are provided.

16 Claims, 5 Drawing Sheets

(51) Int. Cl.
  *G01K 7/02* (2021.01)
  *G01L 5/00* (2006.01)
  *H02K 7/116* (2006.01)
  *H02K 7/18* (2006.01)
  *G01D 11/30* (2006.01)
  *G01D 21/00* (2006.01)
  *G01D 11/24* (2006.01)

(56) References Cited

U.S. PATENT DOCUMENTS

| | | | | |
|---|---|---|---|---|
| 2014/0150588 | A1* | 6/2014 | Christiansson | F03D 15/00 74/434 |
| 2014/0219593 | A1* | 8/2014 | Lee | G01P 3/488 384/448 |
| 2018/0224306 | A1* | 8/2018 | Wimmer | G01D 21/00 |

FOREIGN PATENT DOCUMENTS

| | | |
|---|---|---|
| CN | 104520578 A | 4/2015 |
| CN | 204514377 U | 7/2015 |
| CN | 105136456 A | 12/2015 |
| CN | 204881845 U | 12/2015 |
| CN | 105473850 A | 4/2016 |
| CN | 107406095 A | 11/2017 |
| DE | 112014000688 T5 | 10/2015 |
| EP | 1292831 A2 | 3/2003 |
| EP | 1292831 B1 | 10/2009 |
| EP | 3150978 A1 | 4/2017 |
| JP | 2003065835 A | 3/2003 |
| WO | WO-2022117146 A1 * | 6/2022 |

OTHER PUBLICATIONS

Chinese Office Action for Chinese Application No. 2020108883060 dated Feb. 11, 2022.
Chinese Office Action for Chinese App. No. 2020108883060 dated Dec. 28, 2022, with English translation.
Indian Office Action for Indian Patent Application No. 202034034851 dispatched Jul. 18, 2022.
Brazilian Office Action for Brazilian Application No. BR102020017664-1 dated Apr. 26, 2023.

* cited by examiner

SENSOR UNIT AND GEAR HAVING AT LEAST ONE SUCH UNIT

This application claims the benefit of European Patent Application No. EP 19194547.6, filed Aug. 30, 2019, which is hereby incorporated by reference in its entirety.

BACKGROUND

The present embodiments relate to a sensor unit, a gear having at least one such sensor unit, a drive train having such a gear, a wind power installation having such a drive train, and an industrial application having such a gear.

It is desirable to design mechanical systems (e.g., in the form of gears) to be Internet of things (IoT)-enabled. To this end, sensor devices are installed in order to pick up measurement variables such as torques, rotation speeds, vibrations, and temperatures. In the case of a gear, the measurement variable pickups of the sensor devices are fitted at various points on and in the gear and then connected to one or more printed circuit boards that have the required voltage supply and signal transmission components for the corresponding sensors. The printed circuit boards are then connected to at least one external voltage supply and signal evaluation unit. This manner of wiring is associated with a high level of expenditure with respect to time and cost.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a sensor unit having an alternative design is provided.

A sensor unit of one more of the present embodiments has an annular base body that receives sensor constituent parts and at least one printed circuit board. Owing to the fact that sensor constituent parts of various sensor devices and the at least one printed circuit board, which has voltage supply and signal transmission components for these sensor constituent parts, are pre-fitted on a single annular base body and are wired to one another in a suitable manner, the sensor unit according to the present embodiments may be fitted in a mechanical system in a rapid and simple manner since only the base body is to be installed. Accordingly, fitting of the sensor unit according to the present embodiments is accompanied by a low level of expenditure with respect to time and cost.

According to one refinement of the present embodiments, the various sensor devices have at least one temperature sensor device and/or at least one torque sensor device and/or at least one vibration sensor device. Therefore, all of the data that is required, for example, for monitoring a gear may be picked up using a single sensor unit.

A single interface that is accessible from the outside may be provided on the base body for the connection of external voltage supply and signal transmission lines. In this way, handling of a sensor unit according to the present embodiments with respect to the connection of the sensor unit to an external voltage supply and signal evaluation device is considerably improved.

A measurement variable pickup of at least one temperature sensor device and a measurement variable pickup of at least one vibration sensor device may be positioned on a first end side of the base body as sensor constituent parts, and the voltage supply and signal transmission interface is positioned on an opposite second end side of the base body. Accordingly, the measurement variable pickups of the temperature sensor device and of the vibration sensor device may be oriented to a component to be monitored (e.g., a gear mount for example) when the base body is fitted, while external voltage supply and signal transmission lines are connected from the other end side of the base body.

A signal receiver (e.g., a signal receiver of annular design, such as in the form of a brass strip or the like) may be positioned on the inner periphery of the base body as a sensor constituent part of a torque sensor device. The associated measurement variable pickup and the associated signal transmitter of the torque sensor device are then positioned on a gear shaft radially inward of the base body in the case of a gear.

According to one refinement of the present embodiments, the printed circuit board is positioned in the interior of the base body. One advantage of such an arrangement of the printed circuit board is that the printed circuit board is protected against external influences. This also applies to the wiring arrangements that are present between the sensor constituent parts and the printed circuit board.

The base body may be produced from an oil-resistant, temperature-resistant, and pressure-resistant material (e.g., from a plastic, such as polyamide). Accordingly, the base body may readily withstand the conditions prevailing in a gear or in a mechanical system. The extent of the oil resistance, the temperature resistance, and the pressure resistance of the material is to be respectively defined based on the operating conditions of the mechanical system in which the sensor unit is integrated.

According to one refinement of the present embodiments, the base body is manufactured in an additive manner, which is associated with a high degree of flexibility with respect to the production of the base body and therefore also of the sensor unit. As an alternative, i the base body may be produced using other manufacturing technologies.

The present embodiments further provide a gear having at least one sensor unit according to the present embodiments.

The base body of the sensor unit may be arranged between a gear mount that is arranged on a gear shaft, and a gear housing cover, and may bear against these gear components (e.g., when these gear components are intended to be considered in a focused manner).

A measurement variable pickup and a signal transmitter that transmits the measurement data detected by the measurement variable pickup to a signal receiver that is provided on the inner periphery of the base body may be provided on the gear shaft radially inward of the base body as sensor constituent parts of a torque sensor device.

The present embodiments further provide a drive train including a rotor shaft that is connected in a torque-transmitting manner to a gear that is connected in a torque-transmitting manner to a generator. The gear is configured as a gear according to the present embodiments.

In addition, the present embodiments provide a wind power installation. The wind power installation includes a rotor that is attached to a nacelle. A drive train is arranged in the nacelle and is connected in a torque-transmitting manner to the rotor. The drive train is configured as a drive train according to the present embodiments.

The present embodiments also provide an industrial application. The industrial application includes a drive that is connected in a torque-transmitting manner to a gear that is coupled in a torque-transmitting manner to a mechanical application. The gear is configured as a gear according to the present embodiments.

DETAILED DESCRIPTION

Figure 1:
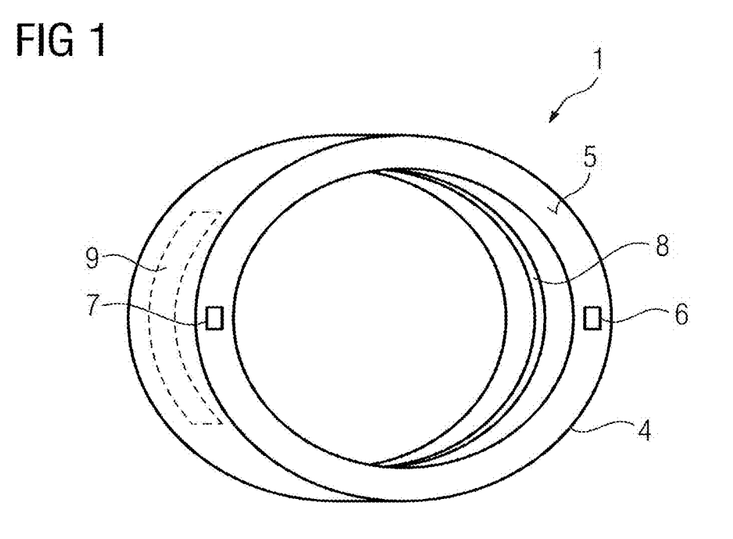
FIG. 1 shows a perspective front view of a sensor unit according to one embodiment.
Figure 2:
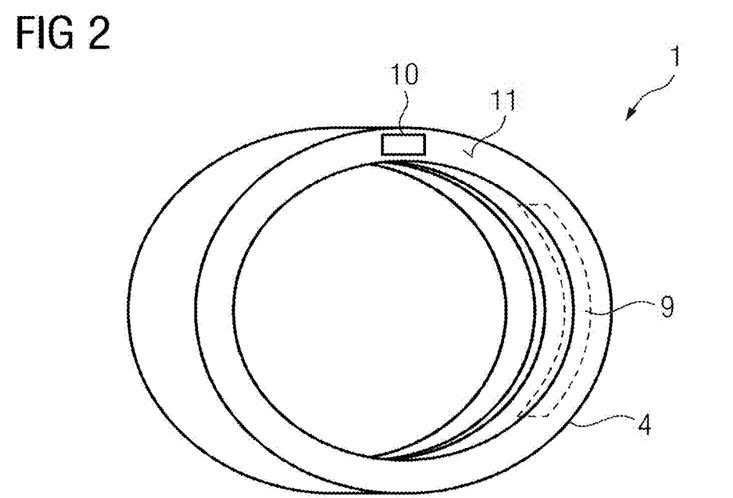
FIG. 2 shows a perspective rear view of the sensor unit shown in FIG. 1.

The sensor unit 1 illustrated in the embodiments shown in FIGS. 1 and 2 is operable to monitor a gear 3 or components of the gear 3 (e.g., for monitoring a gear mount 2), as will be explained in further detail below with reference to FIG. 3. The sensor unit 1 includes an annular base body 4 that may be produced in an additive manner from an oil-resistant, temperature-resistant, and pressure-resistant material (e.g., from polyamide). A measurement variable pickup 6 of a temperature sensor device and a measurement variable pickup 7 of a vibration sensor device are positioned on a first end side 5 of the base body 4 or incorporated into the first end side 5. The measurement variable pickup 6 of the temperature sensor device may be, for example, a thermocouple. The measurement variable pickup 7 of the vibration sensor device used may be, for example, a micro-electro-mechanical-system (MEMS) sensor. A signal receiver 8 (e.g., in the form of a signal receiver of annular design composed of a brass strip) is positioned on an inner periphery of the base body 4 as a sensor constituent part of a torque sensor device. The measurement variable pickups 6 and 7 and the signal receiver 8 are connected to a printed circuit board 9 that is positioned in the interior of the base body 4 in the present case and has the required voltage supply and signal transmission components for the sensor constituent parts. The sensor unit 1 has a single interface 10 that is accessible from the outside, is wired to the printed circuit board 9, and serves for the connection of external voltage supply and signal transmission lines. In the present case, the interface 10 is positioned on that end side 11 of the base body 4 that is situated opposite the end side 5.

Figure 3:
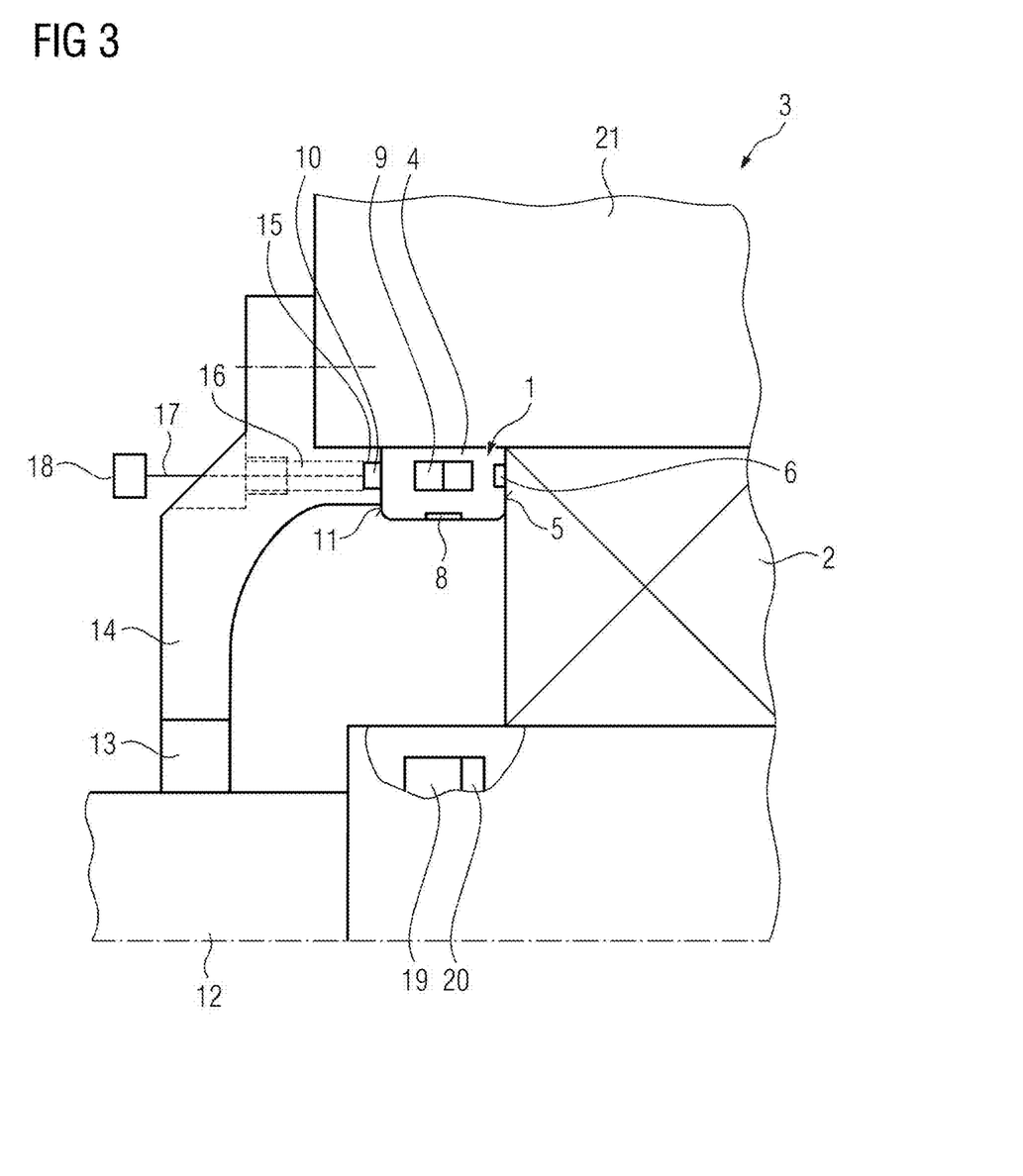
FIG. 3 shows a partial sectional view of a gear having a sensor unit illustrated in FIGS. 1 and 2.

FIG. 3 shows, by way of example, a region of a gear 3 having a gear housing 21 in which a gear shaft 12 is held in a rotatable manner using gear mounts 2, where only one of the gear mounts 2 is illustrated in FIG. 3. The sensor unit 1 illustrated in FIGS. 1 and 2 is fitted between a gear housing cover 14 that is sealed off from the gear shaft 12 by a seal 13, and the gear mount 2. The base body 4 thus bears, at the end side, fixedly against the two components and the measurement variable pickups 6 and 7 of the temperature sensor devices, and vibration sensor devices face the gear mount 2 to be monitored. In the region of the interface 10, the gear housing cover is provided with a cutout 15 and a passage bore 16 that is axially aligned with the interface 10 in order to create space for the connection and passage of voltage supply and signal transmission lines 17 (illustrated using dashed lines in FIG. 3), via which the sensor unit 1 is connected to a voltage supply and signal evaluation device 18. A measurement variable pickup 19 and a signal transmitter 20, which are incorporated into the gear shaft 12 in the present case, are provided on the gear shaft 12 radially inward of the base body 4 as further sensor constituent parts of the torque sensor device.

A significant advantage is that the measurement variable pickups 6, 7 and the signal receiver 8 (e.g., for sensor components of various sensor devices) may be fitted in a mechanical system with a low level of expenditure with respect to time and cost since the measurement variable pickups 6, 7 and the signal receiver Bare arranged on a single base body 4. A further advantage is that the sensor unit 1, owing to the single interface 10, may also be connected to the external voltage supply and signal evaluation device 18 in a rapid and simple manner.

Figure 4:
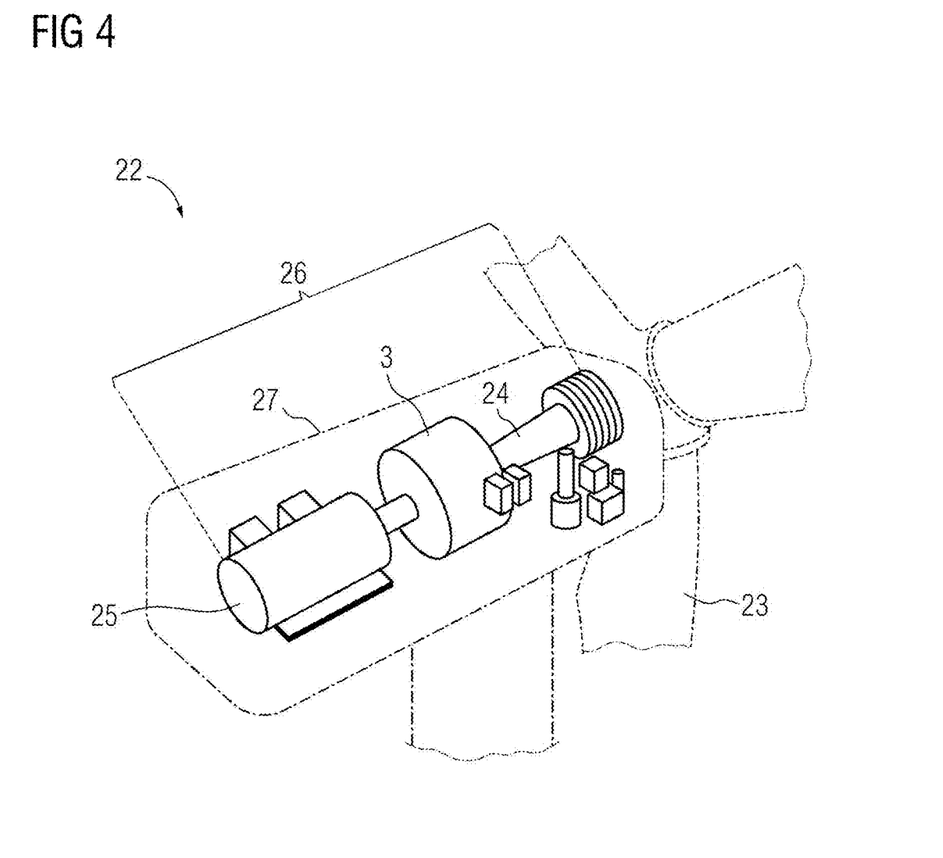
FIG. 4 shows a sectioned side view of one embodiment of a wind power installation.

FIG. 4 illustrates a sectioned oblique view of one embodiment of a wind power installation 22. The wind power installation 22 includes a rotor 23 that may be made to rotate by wind. The rotor 23 is connected in a torque-transmitting manner to a gear 3 according to the present embodiments, which is embodied as a planetary gear, by a rotor shaft 24. The gear 3 is connected in a torque-transmitting manner to a generator 25. The rotor shaft 24, the gear 3, and the generator 25 form part of a drive train 26 that is accommodated in a nacelle 27 of the wind power installation 22. The generator 25 has two, three, or four pole pairs.

Figure 5:
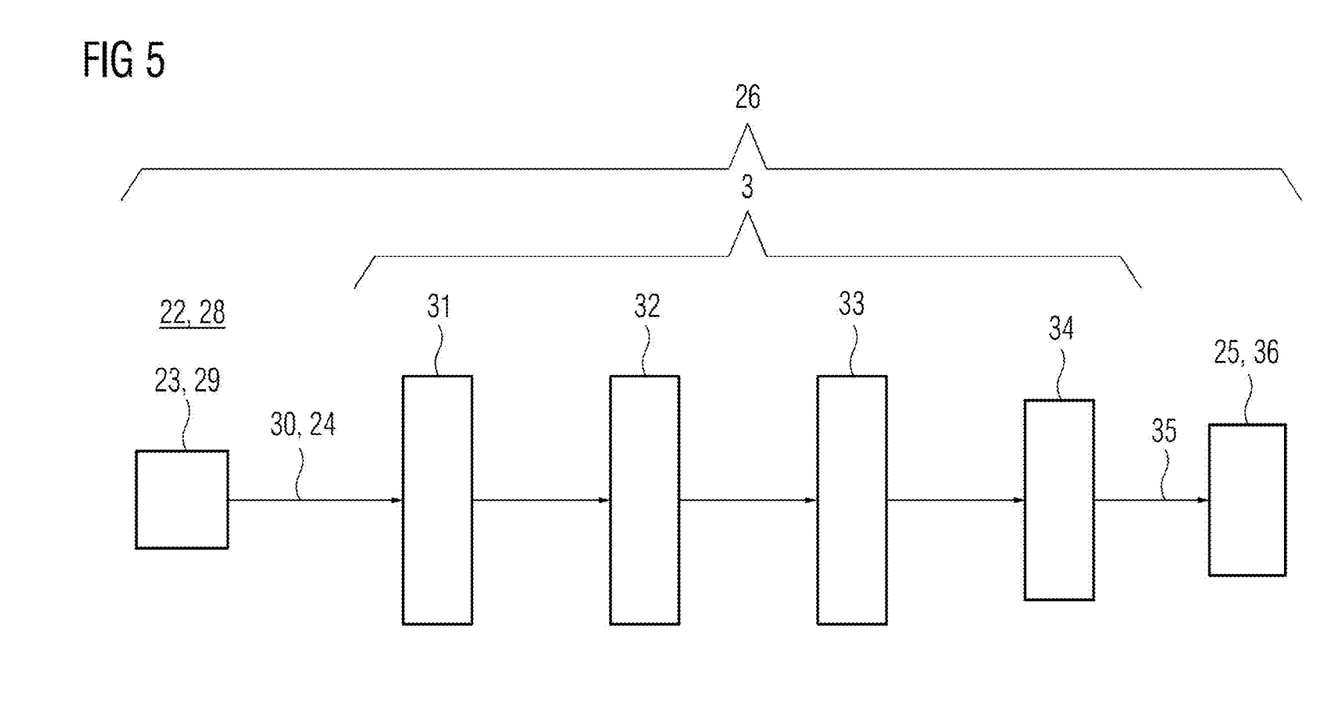
FIG. 5 shows a schematic illustration of one embodiment of a drive train.

FIG. 5 shows a schematic design of a further embodiment of the drive train 26 that may be used in a wind power installation 22, not illustrated in any detail, or an industrial application 28, not illustrated in any detail. The drive train 26 includes a gear 3 according to the present embodiments that is embodied as a planetary gear and is connected on the input side to a drive 29 or a rotor 23 of the wind power installation 22. Drive power 30 is fed to the gear 3 in this way. In a wind power installation 22, this takes place using a rotor shaft 24. In the present case, the gear 3 includes planetary stages 31, 32, and 33 and a spur gear stage 34 that are arranged behind one another. The gear stages 31, 32, 33 and 34 output output power 35 to a generator 25 or a mechanical application 36.

Figure 6:
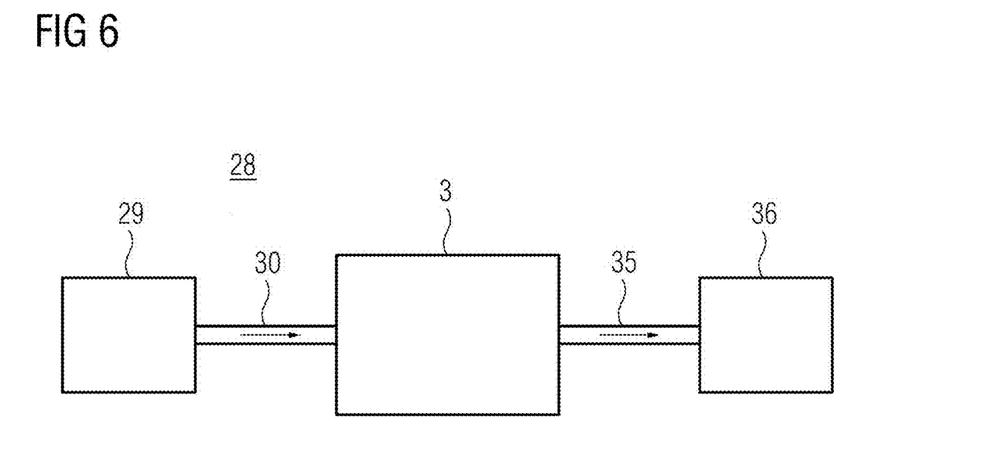
FIG. 6 shows a schematic illustration of one embodiment of an industrial application.

FIG. 6 schematically illustrates the design of one embodiment of an industrial application 28 that has a drive 29. The drive 29 is configured to provide drive power 30 that is transported to a gear 3 according to the present embodiments via a torque-transmitting connection. The gear 3 is connected in a torque-transmitting manner to a mechanical application 36 in order to transport output power 35 to the mechanical application 36.

Although the invention has been described and illustrated in greater detail via the exemplary embodiments, the invention is not limited by the examples that are disclosed; other variations may be derived therefrom by a person skilled in the art, without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A sensor unit comprising:
sensor constituent parts of various sensor devices; and
at least one printed circuit board that has voltage supply and signal transmission components for the sensor constituent parts and to which the sensor constituent parts are connected,
wherein the sensor unit has a base body that is annular and receives the sensor constituent parts and the at least one printed circuit board,
wherein the base body of the sensor unit is arranged between a gear mount that is arranged on a gear shaft and a gear housing cover,
wherein a measurement variable pickup and a signal transmitter are provided on the gear shaft radially inward of the base body as sensor constituent parts of a torque sensor device,
wherein the various sensor devices include at least one torque sensor device, and
wherein a signal receiver of annular design is positioned on an inner periphery of the base body as a sensor constituent part of the at least one torque sensor device.

2. The sensor unit of claim 1, wherein the various sensor devices have at least one temperature sensor device, at least one vibration sensor device, or any combination thereof.

3. The sensor unit of claim 1, wherein a single interface that is accessible from outside is provided on the base body for connection of external voltage supply and signal transmission lines.

4. The sensor unit of claim 3, wherein a measurement variable pickup of at least one temperature sensor device and a measurement variable pickup of at least one vibration sensor device are positioned on a first end side of the base body as sensor constituent parts, and
wherein the single interface is positioned on a second end side of the base body, the second end side being opposite the first end side.

5. The sensor unit of claim 1, wherein the at least one printed circuit board is positioned in an interior of the base body.

6. The sensor unit of claim 1, wherein the base body is produced from an oil-resistant, temperature-resistant, and pressure-resistant material.

7. The sensor unit of claim 6, wherein the base body is made of a plastic.

8. The sensor unit of claim 7, wherein the base body is made of poly amide.

9. The sensor unit of claim 1, wherein the base body is an additive manufactured base body.

10. The sensor unit of claim 1, wherein the signal receiver is in the form of a brass strip.

11. The sensor unit of claim 1, wherein the signal receiver is in the form of a ring section.

12. A gear comprising:
a sensor unit comprising:
sensor constituent parts of various sensor devices; and
at least one printed circuit board that has voltage supply and signal transmission components for the sensor constituent parts and to which the sensor constituent parts are connected,
wherein the sensor unit has a base body that is annular and receives the sensor constituent parts and the at least one printed circuit board,
wherein the base body of the sensor unit is arranged between a gear mount that is arranged on a gear shaft and a gear housing cover,
wherein a measurement variable pickup and a signal transmitter are provided on the gear shaft radially inward of the base body as sensor constituent parts of a torque sensor device,
wherein the various sensor devices include at least one torque sensor device, and
wherein a signal receiver of annular design is positioned on an inner periphery of the base body as a sensor constituent part of the at least one torque sensor device.

13. The gear of claim 12, wherein the base body of the sensor unit is arranged between the gear mount that is arranged on the gear shaft and the gear housing cover, and bears against the gear mount and the gear housing cover.

14. A drive train comprising:
a rotor shaft that is connected in a torque-transmitting manner to a gear, the gear being connected in a torque-transmitting manner to a generator,
wherein the gear comprises:
a sensor unit comprising:
sensor constituent parts of various sensor devices; and
at least one printed circuit board that has voltage supply and signal transmission components for the sensor constituent parts and to which the sensor constituent parts are connected,
wherein the sensor unit has a base body that is annular and receives the sensor constituent parts and the at least one printed circuit board,
wherein the base body of the sensor unit is arranged between a gear mount that is arranged on a gear shaft and a gear housing cover,
wherein a measurement variable pickup and a signal transmitter are provided on the gear shaft radially inward of the base body as sensor constituent parts of a torque sensor device,
wherein the various sensor devices include at least one torque sensor device, and
wherein a signal receiver of annular design is positioned on an inner periphery of the base body as a sensor constituent part of the at least one torque sensor device.

15. A wind power installation comprising:
a rotor that is attached to a nacelle; and
a drive train that is arranged in the nacelle and is connected in a torque-transmitting manner to the rotor, the drive train comprising a rotor shaft that is connected in a torque-transmitting manner to a gear, the gear being connected in a torque-transmitting manner to a generator,
wherein the gear comprises:
a sensor unit comprising:
sensor constituent parts of various sensor devices; and
at least one printed circuit board that has voltage supply and signal transmission components for the sensor constituent parts and to which the sensor constituent parts are connected,
wherein the sensor unit has a base body that is annular and receives the sensor constituent parts and the at least one printed circuit board,
wherein the base body of the sensor unit is arranged between a gear mount that is arranged on a gear shaft and a gear housing cover, wherein a measurement variable pickup and a signal transmitter are provided on the gear shaft radially inward of the base body as sensor constituent parts of a torque sensor device, wherein the various sensor devices include at least one torque sensor device, and wherein a signal receiver of annular design is positioned on an inner periphery of the base body as a sensor constituent part of the at least one torque sensor device.

16. An industrial application comprising:

a gear; and a drive that is connected in a torque-transmitting manner to the gear, the gear being coupled in a torque-transmitting manner to a mechanical application, wherein the gear comprises:

a sensor unit comprising:

sensor constituent parts of various sensor devices; and at least one printed circuit board that has voltage supply and signal transmission components for the sensor constituent parts and to which the sensor constituent parts are connected, wherein the sensor unit has a base body that is annular and receives the sensor constituent parts and the at least one printed circuit board, wherein the base body of the sensor unit is arranged between a gear mount that is arranged on a gear shaft and a gear housing cover, wherein a measurement variable pickup and a signal transmitter are provided on the gear shaft radially inward of the base body as sensor constituent parts of a torque sensor device, wherein the various sensor devices include at least one torque sensor device, and wherein a signal receiver of annular design is positioned on an inner periphery of the base body as a sensor constituent part of the at least one torque sensor device.

* * * * *